INVENTOR
Floyd K. Richtmyer
BY
ATTORNEY

Patented June 18, 1929.

1,717,938

UNITED STATES PATENT OFFICE.

FLOYD K. RICHTMYER, OF ITHACA, NEW YORK, ASSIGNOR, BY MESNE ASSIGNMENTS, TO RAY-SIGNS CORPORATION, A CORPORATION OF DELAWARE.

SIGN.

Application filed August 3, 1927. Serial No. 210,446.

My invention constitutes an improvement in signs or other public notices, the characters in which are formed by the assembly in proper arrangement of a plurality of optical reflecting units, which become luminous and have the appearance of being self-illuminated as a result of the reflection of light directed upon them, somewhat after the property of animals' eyes in the dark. These optical units are composed each of an objective lens of glass or equivalent material and a reflector suitably associated with the lens. For satisfactory performance, it is essential that the reflecting unit not only return a parallel beam of light as a diverging cone of light, the axis of the cone coinciding, approximately, with the direction of the incident beam, but also that the unit function with substantially equal efficiency through a comparatively wide range of angles of incidence of the light. If, for example, the unit be employed in a roadside sign, which at night is intended to be illuminated by the headlights of passing vehicles, it is necessary that the reflected light be sufficiently diverging to strike the eyes of the occupants of the car, which are usually on a level considerably above that of the headlights. Also it is necessary that the component units of the sign be equally luminous irrespective of the precise path of the vehicle, or, in other words, the precise angle at which the light is thrown upon the sign by the headlights. The units should also present a uniform appearance, i. e. should be of uniform brightness. This means exact reproduction of dimensions from one unit to another, appearance being very sensitive to change of dimensions.

The most satisfactory reflecting device heretofore devised and employed for this purpose is one in which the lens is composed of a cylindrical glass body having a convex spherical front end and a plano rear end, together with a concave reflector disposed behind the lens in axial alignment therewith. The dimensions and relative disposition of the parts are comparatively critical. For example, it has been found that, for glass having an index of refraction of substantially 1.5, the best results are obtained if the length of the glass body be substantially twice the radius of curvature of the spherical front end and the radius of curvature of the concave reflector be substantially two-thirds the length of the body, the reflector being disposed immediately behind the plano end, and having its center coincident with that of the spherical end of the lens. It has been the practice with this type of unit to make the reflector of polished metal with a cylindrical sleeve portion fitting over the rear end of the cylindrical glass body, the unit ordinarily being set with its rear end in cement so as properly to protect the inner surface of the reflector from dust and moisture.

Modifications of this general form of reflecting unit have been proposed including units in which the objective and the mirror are made in one piece from glass the limiting active surfaces of which are portions of spheres having a common center and having their active surfaces opposed to one another.

As far as I am aware, however, none of these proposed modified forms has proven commercially successful and, so far as they have been tested, they have proven inferior in their optical performance to the one above referred to, in which the mirror is a separate element and the lens is plano-convex. The light utilization, for example, of the unitary structure mentioned above decreases with increasing angle of incidence.

However, there are definite advantages structurally in having the lens and reflector unitary. Since the relative disposition of the surfaces is critical, a unit having two surfaces is superior from a manufacturing and assembling standpoint to one having three surfaces, as with the latter there is always a possibility of maladjustment in assembling which is eliminated with the former. Furthermore, the unitary structure can be made more simple and cheaply.

The unit constituting my invention is composed of a cylindrical glass body having the front end of lenticular power to serve as the objective and the rear end made convex and silvered and constituting the mirror, the length of the body and the radii of the ends being such for a given index of refraction of the glass that oblique as well as axially parallel incident rays will within a wide angular range be returned in toto or substantially so as a diverging cone of light the axis of which is substantially parallel to the direction of the incident rays. The result is a more efficient utilization of the incident light and a more uniform illumination of the lens surface as visioned from the front, than can be effected with any unit of this specific character which has been heretofore proposed, so far as I am aware.

These superior results can be obtained by an important innovation in devices of this kind, as a result of which the central ray of the cylindrical bundle of rays incident upon the front or objective surface of the unit, remains after reflection the central axial ray of the reflected cone of rays, not only when the axis of the incident bundle is parallel to the axis of the unit but when these two axes make comparatively large angles—as much as 30°—with each other. So far as I am aware, no unitary device has yet been disclosed which accomplishes this result.

The innovation consists in discarding the concentric principle usually employed in devices of this kind and in substituting therefor a disposition of the active surfaces, spherical, parabolic or otherwise, so that the above mentioned central ray of the incident bundle, after refraction at the front (objective) surface meets the rear reflecting surface at substantially normal incidence, as a result of which this ray is reflected, at this rear surface, so as to retrace its path back through the system. At the same time the extra axial rays of the incident bundle are more or less symmetrically reflected so as to emerge symmetrically on the opposite side of the axial ray. I have found that with spherical surfaces this can be accomplished by giving to the rear surface a radius of curvature about twice that of the front surface, (more or less depending on the index of refraction of the glass used, as is indicated by the illustrative data below) and by placing the center of curvature of the rear surface approximately midway between the center of curvature of the front surface and the vertex of that surface. The net result of this innovation is to increase the effective aperture of the objective surface for an obliquely incident bundle of rays over and above the corresponding aperture of those devices in which the concentric adjustment of the two spherical surfaces is employed.

In the drawings, I have shown diagrammatically the optical performance of a unit embodying my invention:

The illustrated unit is a cylindrical glass body with a spherical front or objective end F with its center of curvature at $O_1$, and with a spherical rear end R which is silvered and which has its center of curvature at $O_2$. The index of refraction of the illustrated unit is chosen at 1.52. The center of curvature $O_2$ of the rear face R is substantially midway between the center of curvature $O_1$ of the front face F and the axial center or vertex of that face, and the radius of curvature of the rear face is substantially 2.2 times the radius of curvature of the objective or front face, the length of the unit being therefore 2.7 times the front radius.

Figure 1:
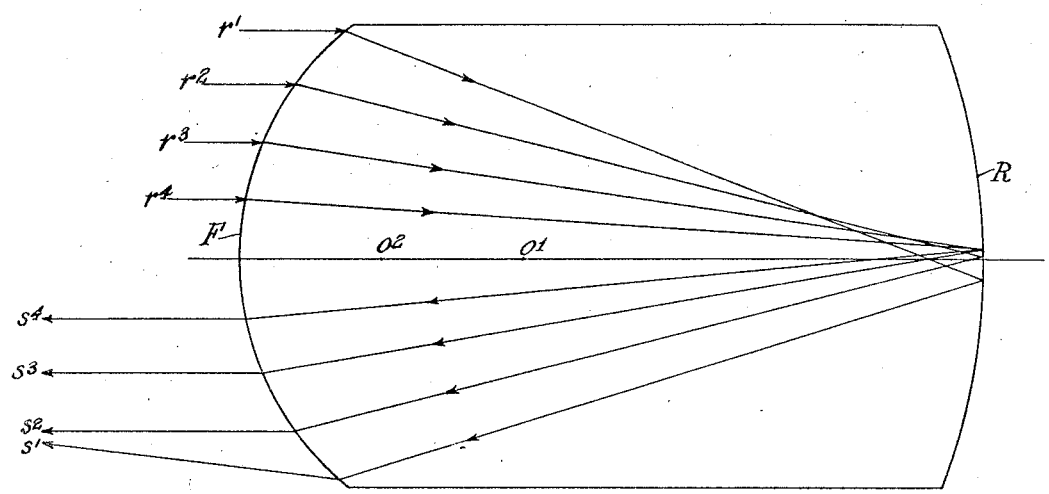
Fig. 1 is a diagram showing the lens in cross section and showing the action of the unit upon rays entering parallel to the axis.

The diagram of Figure 1 illustrates the function of the unit upon an axially parallel bundle of light, i. e., a bundle of light whose direction of incidence is parallel to the axis of the unit. The rays $r_1$, $r_2$, $r_3$, $r_4$ are refracted on entering the glass medium and converge to within a small area of the mirror R by which they are reflected along the paths indicated and are again refracted on emerging from the glass and are returned as the rays $s_1$, $s_2$, $s_3$, $s_4$, respectively. The rays of the reflected bundle are first converging and then diverging due to the fact that they are not brought to a sharp focus on the mirror, or, in other words, due to the spherical aberration of the system. In this way the desired spread is obtained, the proportions and the dimensions being so selected that the angle of deviation of the emergent rays with the direction of incidence is just enough for the purpose in the case of substantially parallel incident rays.

Figure 2:
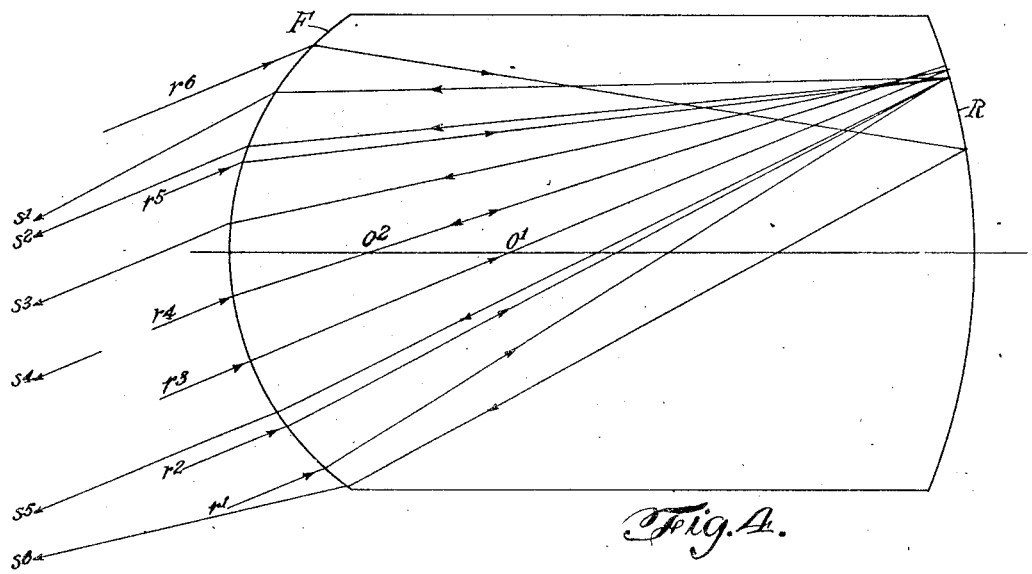
Fig. 2 is a diagram showing a similar view of the lens and showing its action upon rays entering oblique to the axis.

In Figure 2 is shown a unit of the same dimensions and same kind of glass as Figure 1, and illustrating diagrammatically the action of the unit upon an oblique incident bundle of rays. The angle of incidence chosen for this illustration is substantially 22.5°. The incident rays $r_1$, $r_2$, $r_3$, $r_4$, $r_5$, $r_6$, are returned as rays $s_1$, $s_2$, $s_3$, $s_4$, $s_5$, $s_6$, the reflected light being a cone with its axis substantially parallel to the direction of incidence. The cone is convergent to a degree just enough to give the desired spread to the light at the distance at which the signs are usually observed.

An important feature of the operation of my unit is the fact that the central incident ray $r_4$ remains the central ray $s_4$ of the light returned, whatever the angle of incidence. For a given index of refraction of the glass, the center $O_2$ is so located that for angles of incidence not exceeding a permissible maximum (approximately 40° either side of axial parallelism) the central incident ray is so refracted as to pass through the center $O_2$ and hence, entering along a line of radius of the rear face, it is returned along the same path. It will be understood that the exact position of the center of curvature and length of radius of the rear face vary somewhat according to the index of refraction of the glass and the use to which the unit is to be put and at best are but approximations, but I have found the following dimensions to give good results where a wide range of angles of incidence and a small divergence of the reflected cone are desired:

| Index of refraction | Front radius | Rear radius | Length |
|---|---|---|---|
| 1.50 | R | 2.2R | 2.7R |
| 1.60 | R | 1.98R | 2.48R |
| 1.70 | R | 1.78R | 2.28R |

It will be noted that in the above table I have assumed that $O_2$ remains exactly half way between $O_1$, and the front vertex. The central incident ray will always be refracted so as to pass substantially through the center $O_2$ and therefore strike the reflecting surface R at normal incidence. The radius of the rear surface is so chosen that as illustrated in Figure 2, the rays other than the central ray are symmetrically reversed. The ray $r_2$, for example, emerges as ray $s_2$, which two rays are symmetrical with respect to the central ray $r_4$. Similarly the ray $r_3$ which strikes the front face at normal incidence and travels along a radius of the center $O_1$ is displaced sidewise substantially an equal distance on the other side of the ray $r_4$, due to its angle of incidence on the reflector R. The cross sectional area of the reflected bundle of light is substantially that of the incident bundle, and this effective aperture of the unit is substantially unaffected by changing the angle of incidence.

This desirable function of my unit in large part results from the fact that the center $O_2$ is in advance of the center $O_1$. The precise disposition of the center $O_2$ and length of the radius of curvature of the mirror depend somewhat upon the use.

Figure 3:
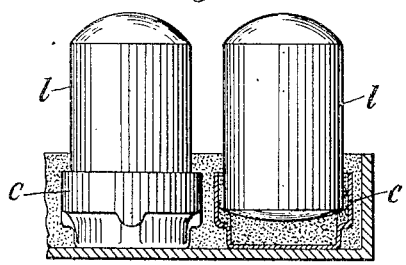
Fig. 3 is a section of a portion of a sign including two of my units, one of which is shown with the cap in elevation and the other with the cap in section.

In Fig. 3, I have shown two of my units as they will be mounted in a sign. Each lens $l$ is mounted with its rear silvered end in a metallic cap C in which it is cemented. The silvered end is thereby hermetically sealed against dirt and moisture. The caps preferably have flat ends normal to the axis of the lenses, the sleeve portions of the caps assuring proper relative disposition of the lenses in the caps. The rear ends of the units may be imbedded in cement, as indicated in the figure.

Figure 4:
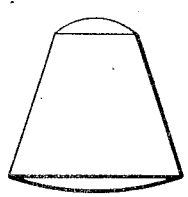
Fig. 4 is an elevation of a modified form of lens embodying my invention.

It is obvious that my invention is not limited to this precise method for protecting the silvered ends of the units or for mounting the units in the sign. It may also be commented that the rear end of the unit may be of larger diameter than the front end to give a greater range of aspect, as illustrated in Fig. 4. Various other modifications may also be made in the illustrated embodiments of my invention without departing from the spirit or scope of my invention as defined in the appended claims.

I claim:

1. An optical unit of the reflecting type comprising a glass body having its ends convexly spherical and having its rear end reflective, the center of curvature of the rear face being so positioned for the particular index of refraction of the glass and the radius of the rear face being such that the central or axial ray of an oblique bundle of incident rays of light will pass substantially through said center and the extra-axial rays of the incident bundle will be substantially symmetrically reflected so as to emerge symmetrically on the side of the axial ray opposite to that of their incidence.

2. An optical unit of the reflecting type comprising a glass body having its ends convexly spherical and having its rear end reflective, the center of curvature of the rear face being so positioned for the particular index of refraction of the glass and the radius of the rear face being such that the central or axial ray of an oblique bundle of incident rays of light will pass substantially through said center and the extra-axial rays of the incident bundle will be substantially symmetrically reflected as a diverging cone of light the axis of which is substantially parallel to the direction of incidence.

3. An optical unit of the reflecting type comprising a glass body having its ends convexly spherical and having its rear end reflective the center of curvature of the rear face being between the center of curvature of the front face and the axial center of the front face, and the radius of curvature of the rear face being substantially twice that of the front face.

4. An optical unit of the reflecting type comprising a glass body having its ends convexly spherical and having its rear end reflective, the center of curvature of the rear face being substantially midway between the center of curvature of the front face and axial center of the front face, and the radius of curvature of the rear face being substantially twice that of the front face.

5. An optical unit of the reflecting type comprising a lens and a concave reflector at the rear end of the lens, the center of curvature of the reflector being so located in advance of the center of curvature of the lens that for a given index of refraction of the material of the lens the central ray of an incident bundle of rays of light either parallel to the axis or oblique to the axis of the lens will strike the reflector along substantially a radial line, and the length of the radius of the reflector exceeding that of the front face of the lens and proportioned thereto so that the extra axial rays of the incident bundle will be substantially symmetrically reflected so as to emerge symmetrically on the side of the axial ray opposite to that of their incidence.

6. An optical unit of the reflecting type comprising a lens and a concave reflector at the rear end of the lens, the center of curvature of the reflector being so located for a given index of refraction of the material of the lens that the central ray of an incident bundle of rays of light either parallel to the axis or oblique to the axis of the lens will strike the reflector along substantially a radial line, and the radius of curvature of the reflector being substantially twice that of the front face of the lens.

7. An optical unit of the reflecting type comprising a lens and a concave reflector behind the lens disposed with its vertex substantially at the focal point of a bundle of rays axially incident upon the lens and having its center of curvature on the axis of the system substantially at the point where the axis is intersected by the line of incidence upon the reflector of the central ray of a bundle of rays obliquely incident upon the objective face of the lens.

In witness whereof, I hereunto subscribe my signature.

FLOYD K. RICHTMYER.